April 4, 1939.   O. W. SJOGREN ET AL   2,152,928
DISK HARROW
Filed April 1, 1935   2 Sheets-Sheet 2

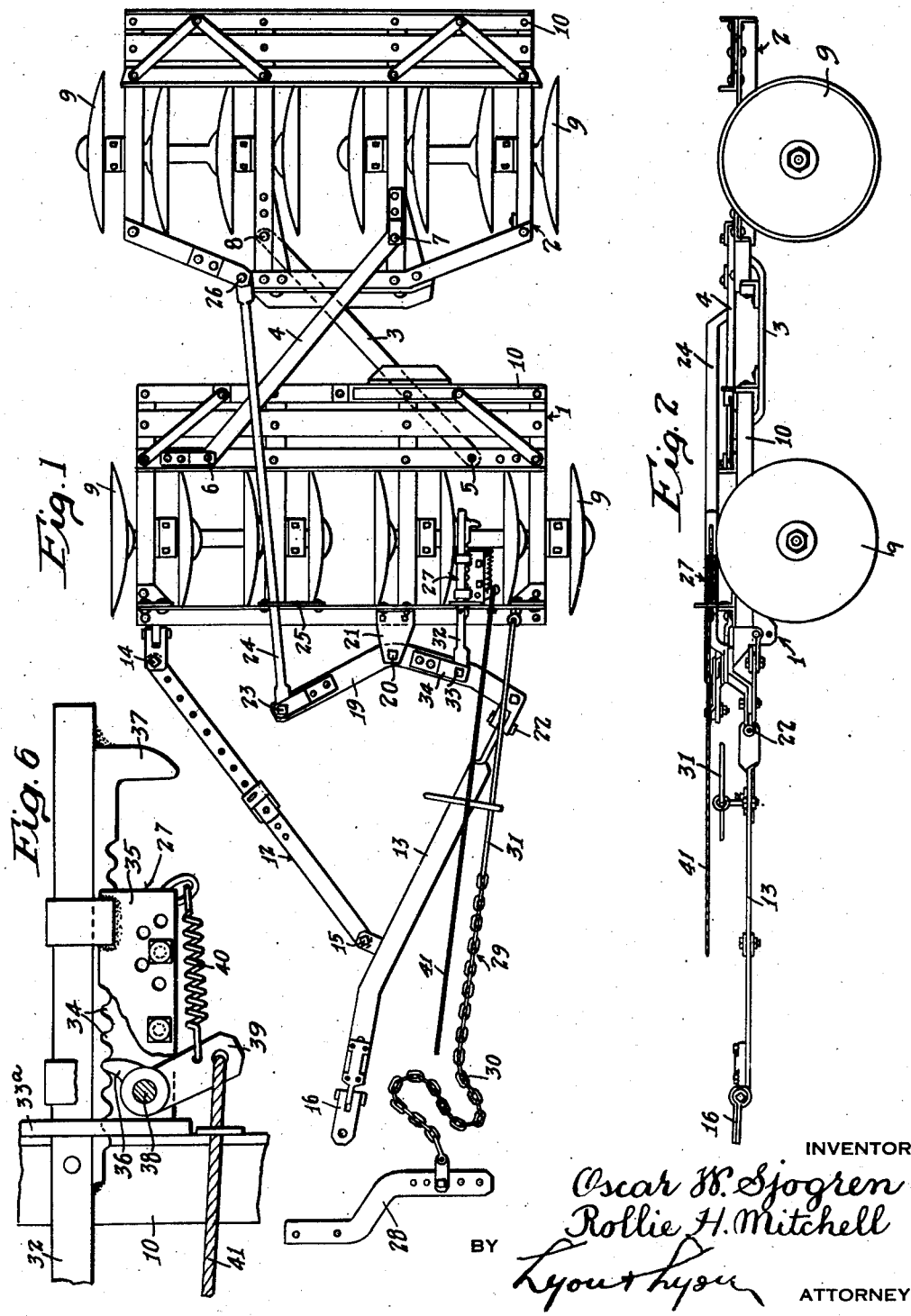

INVENTORS
Oscar W. Sjogren
Rollie H. Mitchell
BY
ATTORNEYS

Patented Apr. 4, 1939

2,152,928

UNITED STATES PATENT OFFICE 2,152,928

DISK HARROW

Oscar W. Sjogren, Huntington Park, and Rollie H. Mitchell, South Park, Calif., assignors, by mesne assignments, to Killefer Manufacturing Corporation, a corporation of California Application April 1, 1935, Serial No. 14,000

17 Claims. (Cl. 55—83)

This invention relates to disk harrows, and more particularly to a disk harrow of the single tandem type operable in offset position with relation to the draft means or tractor utilized for pulling the harrow.

This invention is addressed to an improvement of the offset disk harrow as disclosed by the M. M. Brodersen, et al. Patent No. 1,831,947, granted November 17, 1931. This application is a continuation in part of our copending application for disk harrow filed May 18, 1934, Serial No. 726,314.

It is an object of this invention to provide an improved form of control mechanism for operation of a single tandem disk harrow, which improved control mechanism includes a means whereby the harrow under operation and with the two gangs thereof angled apart to working position, may be turned in a direction around the open ends of the gangs and may be returned to angled position upon the continued movement of the tractor while the turn is negotiated.

Another object of this invention is to provide a single tandem disk harrow including a hitch mechanism and means operable from the tractor connected with the front disk gang at a point near the closed ends of the gangs or the end of the disk gang from which the gangs are angled apart as the disk harrow turns in a direction around the open ends of the gangs to pull the front gang out of angle, thereby permitting the rear gang to move out of angle as the disk implement makes the turn in the direction around the open ends of the gangs.

Another object of this invention is to provide a single tandem disk harrow including an improved form of angled control means wherein means are provided for actuating the forward gang of disks to angled position to open the gangs of disks at one end and wherein means are provided for holding the open end of the rear gang of disks stationary during the forward movement of the disk harrow in the angling of the gangs to insure that the rear gang will acquire the desired angularity in moving to working position.

Other objects and advantages of this invention it is believed will be apparent from the following detailed description of a preferred embodiment thereof as illustrated in the accompanying drawings.

In the drawings:

Figure 1 is a top plan view of the disk harrow embodying our invention.

Figure 2 is a side elevation thereof.

Figure 6 is an enlarged detail view illustrating the latch mechanism provided for the harrow embodying our invention.

Figure 3:
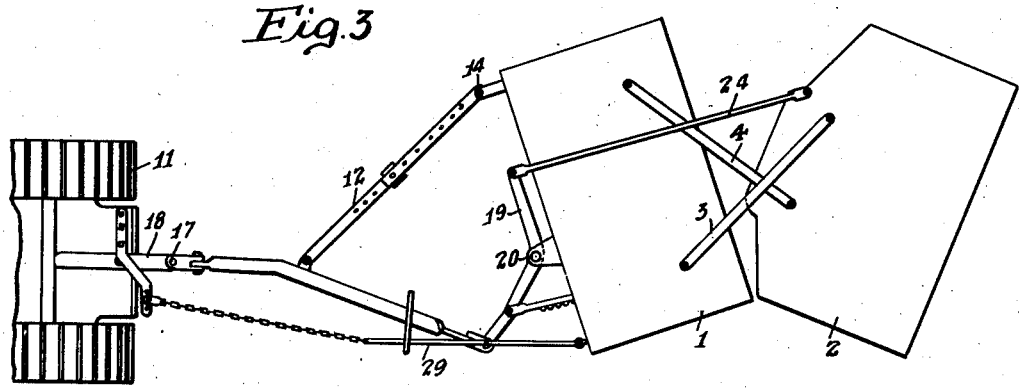
Figure 3 is a top plan view diagrammatic in character illustrating the disk harrow as embodying our invention in angled position.

In the preferred embodiment of our invention as illustrated in the accompanying drawings, 1 indicates a front gang of disks and 2 indicates a rear gang of disks. The gangs of disks are pivotally connected together so as to permit the same to move to and from angled or working position by means of cross bars 3 and 4 which are connected in spaced relation to the front disk gang at the pivots 5 and 6 and are connected in spaced relation to the rear gang of disks at the pivots 7 and 8. Each of the disk gangs includes a plurality of concavo-convex disks 9, and the disks 9 of the front gang 1 are all mounted with their concave faces turned toward one side of the disk harrow and the disks 9 of the rear gang 2 are mounted in a reverse direction. Each of the gangs of disks 1 and 2 includes a frame 10, the particular construction of which forms no part of our present invention but may be of any suitable or desirable form well understood in the art.

A hitch mechanism is provided for coupling the disk harrow with a tractor 11, which hitch mechanism is preferably of the following construction:

The hitch includes a pair of bars 12 and 13. The bars 12 commonly referred to in such harrows as the offset bar is adjustable in length in a manner well understood in the art and is pivotally connected at pivot 14 to the open end of the front disk gang. In using the expression "open end" applicants are referring to that end of the disk gangs at which the disk gangs are normally angled apart when the disk gangs are moved to angled or working position, and in utilizing the term "closed end", applicants refer to that end of each disk gang at which the disk gangs move together when the disk gangs are angled to working position.

As viewed in Figure 1, looking from the rear to the front of the harrow, the open end is the right end of each disk gang, and the closed end is the left end of each disk gang. The bar 13 of the hitch sometimes referred to in the art as the angled control bar is pivotally connected to the bar 12 of the hitch at a pivot 15 and extends forwardly therefrom and is provided with a clevis 16 by means of which the disk harrow is pivotally coupled at a pivot 17 to the draw bar 18 of the tractor 11. The bars 12 and 13 thus form a swinging type of hitch and are swingedly connected to the open end of the front disk gang at the pivot 14.

A hold-back lever 19 is pivotally connected between its ends at a pivot 20 within the bracket 21 secured to the frame 10 of the forward disk gang 1. At one end the hold-back lever is pivotally connected at the pivot 22 to the hitch bar 13. At its opposite end the hold-back lever 19 is connected at a pivot 23 to the hold-back bar 24 which extends through a guide bracket 25 mounted upon the frame 10 of the disk gang 1 to the frame 10 of the rear disk gang 2 where it is pivotally connected by means of a pivot 26. In order to limit and determine the angularity to which the disk gangs will move in moving from parallel to the angled position, a latch mechanism 27 is provided preferably coupled between the lever 19 and the frame 10 of the disk gang 1.

In order that the disk gangs 1 and 2 may follow the tractor 11 in making a turn around the open ends of the disk gangs 1 and 2, the following mechanism is preferably provided:

Mounted upon the tractor 11 to extend laterally from the pivot 17 and in a direction toward the closed ends of the disk gangs, is a right turn bar 28. Coupled between the right turn bar 28 at a point offset laterally from the pivot 17 is a connection 29 which is connected to the closed end of the frame 10 of the disk gang 1.

The connection 29 is preferably a flexible connection formed in part of a chain 30 and in order to prevent the chain from becoming entangled within the disk mechanism, the chain is connected with a rod 31, which completes the connection between the bar 28 and the frame 10 of the disk gang 1.

The latch mechanism included in the harrow embodying our invention preferably includes a latch bar 32 which is pivotally connected at a pivot 33 to a bracket 34 mounted upon the lever 19, and the latch bar 32 extends through a guide 33ª mounted upon the frame 10 of the disk gang 1. The latch bar 32 is provided with latch teeth 34. Mounted upon the latch bar 32 is a latch slide 35 carrying a pawl 36 adapted to engage the teeth 34 to hold the slide from moving rearwardly along the length of the latch bar 32 but which teeth of the latch bar are of the construction well understood in the art which permits the latch slide 35 to move forwardly along the latch bar 32, even with the pawl in the tooth-engaging position.

A limit stop 37 is provided at the end of the latch bar 32 to limit the rearward movement of the latch slide 35 upon the latch bar 32. The latch pawl 36 is carried upon a latch pin 38 in the latch slide 35, and an actuating lever 39 is secured to the latch pawl 36 for the purpose of rotating the pawl to and from engaging position.

A spring 40 normally holds the latch pawl in engaged position. A flexible connection 41 is connected with the lever 39 and extends forwardly from the harrow to the tractor to a position where it may be actuated by the operator of the tractor.

In operation the latch is utilized for the purpose of limiting the angularity to which the gangs may be moved and it will be observed that the operator may adjust the angularity of the gangs 1 and 2 while the tractor is in motion by actuating the flexible connection 41 to release the pawl 36 and permit the latch bar 32 to slide forwardly through the latch slide 35 and the position of the latch slide 35 will determine the angularity which the gangs will assume by engagement of the latch slide 35 with the guide 33ª. When the gangs are moved out of angle such as by making a turn or by backing up the tractor 11, the operator may pull forward upon the flexible connection 41 to slide the slide 35 forward on the latch bar 32 and thus limit the angularity to which the gangs will move upon the resumption of the forward movement of the tractor.

Figure 4:
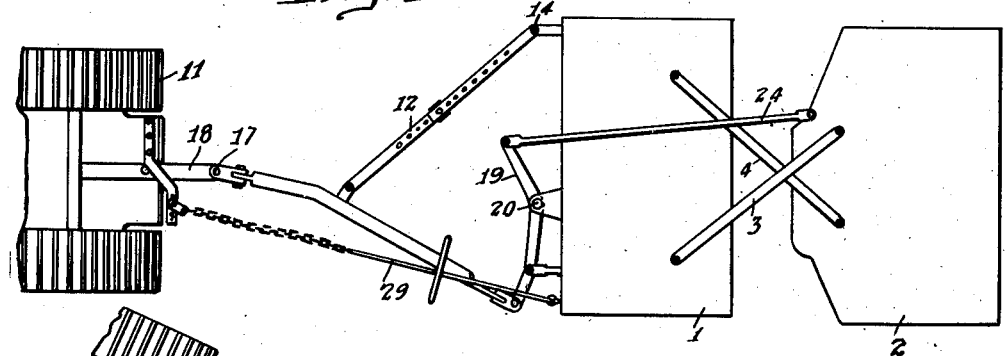
Figure 4 is a similar diagrammatic plan view illustrating the gangs as in the parallel or non-working positions.

In operation the disk harrow embodying our invention has the following mode of operation:

With the disk gangs 1 and 2 in the parallel position as indicated in Figures 2 or 4, the disks 9 are in wheeling position and may be pulled over the surface without actual working of the disks. When it is desired to move the disks 9 to working position, the operator, by actuation of the latch connection 41, releases the latch, thereby permitting the gangs 1 and 2 to move into the angled position illustrated in Figure 3 upon forward movement of the tractor 11. This angling of the gangs is accomplished by the hitch bar 12 acting to pull forwardly at the pivot 14 upon the open ends of the front disk gang 1. As there is no connection at this time in an operative sense at the closed end of the front disc gang 1, this end of the disk gang 1 will remain relatively stationary. The force thus exerted to pull the forward disk gang 1 into angled position at its open end is transmitted through the cross bar 4 to the closed end of the rear disk gang 2, resulting in the closed end of the rear disk gang 2 being likewise pulled forward to angular position. During this operation it will be apparent that the lever 19 pivots upon the pivot 20 with the result that the open end of the rear gang 2 is held relatively stationary and is thereby held from running forwardly until it has assumed its proper angled relation. It will thus be observed that through the connecting means provided, the open end of the front disk gang and the closed end of the rear disk gang are caused to have a relative forward movement with relation to the relatively stationary ends, that is, the closed end of the front disk gang 1 and the open end of the rear disk gang 2 during the angling of the gangs moving from the position indicated in Figure 4 to the position indicated in Figure 3.

Figure 5:
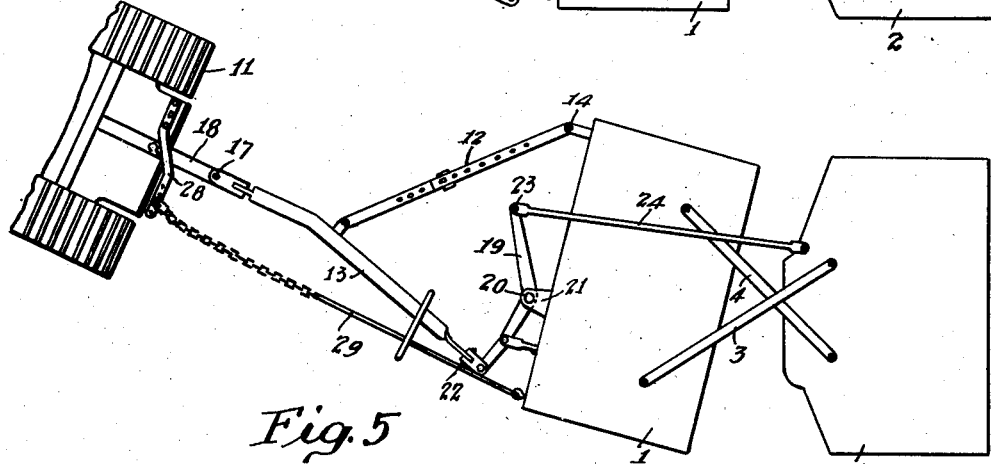
Figure 5 is a similar top plan view diagrammatic in character illustrating the disk harrow as negotiating the turn around the normally open ends of the disk gangs and indicating the disk gangs in position to which they are forced when negotiating such a turn.

With the gangs of disks in the position as indicated in Figure 3, and when the tractor 11 is turned to make a right turn or a turn in a direction around the open ends of the disk gangs 1 and 2, the operation is that the connection 29 between the right turn bar 28 and the closed end of the front disk 1 operates to pull this closed end of the front disk gang 1 forwardly as the tractor has its relative pivotal movement around the pivot 17 connecting the tractor draw bar 18 and the hitch of the harrow. This pulling of the closed end of the front disk gang forwardly operates through the cross bar 3 to cause the open end of the rear disk gang 2 to likewise be pulled forwardly, permitting the opposite ends of the front and rear disk gangs to remain relatively stationary whereby the disk gangs 1 and 2 are moved to a closed or parallel position or may even be moved to a position in excess of the parallel position as indicated in Figure 5, thereby permitting the turn to the right to be made without causing the disks 9 to dig into the soil and oppose the turning of the harrow to the right. As soon as the turn is negotiated and the tractor is again moved forwardly, and assuming that the position of the slide 35 of the latch has not been changed, the disk gangs 1 and 2 will then assume the same angled relationship that they have prior to making the turn without any effort upon the part of the operator.

It will be obvious from the foregoing that when making a run around the closed ends of the gangs that the tractor 11 is merely turned to the left and as the gangs are angled apart in such a manner as to permit this turn that the harrow merely follows the tractor in negotiating a left turn without any action of any of the connections heretofore described tending to change the angular relation of the gangs 1 and 2.

Having fully described our invention, it is to be understood that we do not wish to be limited to the details herein set forth, but our invention is of the full scope of the appended claims.

We claim:

1. In a device of the class described, a pair of tandem disk gangs, means for pivotally connecting said gangs together, a hitch connected to the forward of said gangs, said hitch being capable of moving relative to said forward gang of disks, a draft means, means for pivotally connecting the hitch with the draft means, an arm rigid on the draft means extending laterally relative to the hitch, and means operatively connected between the arm and the front disk gang and operative upon turning of the draft means through said arm to pull the end of the front gang of disks forwardly to permit said gang of disks to follow the draft means in making the turn.

2. In a device of the class described, the combination of a pair of tandem disk harrow gangs, means for pivotally connecting said gangs together in tandem relation to permit said gangs to assume angled and non-angled relation to each other, a hitch connected with the forward of said gangs, said hitch being capable of moving relative to said forward gang of disks, a draft means pivotally connected with the hitch, an arm rigid on the draft means and extending laterally relative to the hitch, and means connected between the arm and one end of the front of said disk gangs and operative upon turning of the draft means to pull said end of the disk gang from angled to non-angled position to permit the device to follow the draft means in making a turn.

3. In a device of the class described, the combination of a pair of tandem disk gangs, means operatively connecting the gangs of disks together to permit the gangs to be moved to and from angled position so that said gangs are angled apart at one end of the device, a hitch operatively connected with the front gang, said hitch being capable of moving relative to said forward gang of disks, a draft means pivotally connected to said hitch, an arm rigid with said draft means extending laterally with reference to the hitch, and a connecting means extending between the arm and the end of the front gang of disks opposite from the end at which said gangs are angled apart, and operative upon the turning of the draft means connected with the hitch to pull said one of the front gang of disks out of angled position to permit the device to follow the draft means in making the turn.

4. In a device of the class described, a pair of tandem disk gangs, means for pivotally connecting said gangs together, a hitch connected to the forward of said gangs, said hitch being capable of moving relative to said forward gang of disks, a draft means, means for pivotally connecting the hitch with the draft means, means operatively connected between the front disc gang and a point of said draft means offset laterally from the point of connection of the hitch and draft means and operative upon turning of the draft implement through said connection to pull the end of the front gang of disks forwardly to permit the front and rear gangs of discs to follow the draft implement in making a turn.

5. In a device of the class described, a pair of tandem disk gangs, means connecting said gangs together to permit the same to swing to and from relative angled relation, a hitch swingedly connected at one end of the forward of said gangs, a draft means, means for connecting the hitch with the draft means, an arm on the draft means extending laterally relative to the hitch, a lever pivotally mounted relative to the front disk gang, means connecting the lever with the hitch at one end of the lever, means for connecting the lever at its opposed end with the rear gang of disks, and means operatively connected between the arm and the front disk gang and operative upon turning of the draft implement to pull the front disk gang forwardly and to permit the said disk gangs to follow the draft implement in making the turn.

6. In a device of the class described, the combination of a pair of disc gangs, means for pivotally connecting said gangs together, a hitch swingedly connected to one end of the front disk gang, a draft means, means for pivotally connecting the hitch with the draft means, an arm rigid with relation to the draft means and extending laterally with relation to the hitch, and means operatively connected with the arm and the front disk gang near the end of the front disk gang opposite from the point of swinged connection with the hitch and operative upon the turning of the draft means through said arm to pull the latter said end of the front disk gang forwardly relative to said hitch to permit said front disk gang to follow the draft means in making the turn.

7. In a device of the class described, the combination of a pair of tandem disk gangs, means connecting the gangs of disks together to permit the gangs to be moved to and from angled position, a hitch operatively connected with the forward gang, said hitch being capable of moving relative to said forward gang of disks, the hitch including an offset bar and a connecting bar, a draft means, means for pivotally connecting the hitch with the draft means, an arm rigid with respect to the draft means, and extending laterally with reference to the point of connection of the hitch to the draft means in the direction opposite from the end of said gangs which are moved apart when angled, and means for connecting the arm to the forward disk gang near the end of the forward disk gang at which the gangs are angled together.

8. In a device of the class described, the combination of a pair of tandem disk gangs, means pivotally connecting the gangs of disks together to permit the gangs to be angled apart at one end to a working position, a hitch swingedly connected with the forward disk gang near the end of said disk gang at which said disk gangs are angled apart, the hitch including an offset control bar and a connecting bar, a draft means, means for pivotally connecting the hitch with the draft means, a control arm rigid with reference to the draft means and extending laterally with reference to the point of connection of the hitch with the draft means and extending in a direction toward the ends of the gangs which move together when the gangs are angled, and means connecting the arm with the front disk gangs near the end opposite from the point of swinged connection with the hitch so that on turning of the draft means in a direction around the open ends of said disk gangs the end opposite to the open end of the front disk gang will be pulled forwardly through said arm and said connecting means to permit the said front disk gang to follow the draft means when making the turn.

9. In a tandem disk harrow, the combination of a pair of tandem disk gangs, means pivotally connecting the disk gangs in tandem relation to permit the same to swing to angled position, a hitch including a pair of hitch bars, one of which hitch bars is connected to the front disk gang near the end thereof at which the disk gangs are angled apart when in angled position, means connecting the said hitch bars together at the opposite end of the latter said bar, a tractor, means for pivotally coupling the tractor with the hitch, a turn arm mounted on the tractor and extending laterally from the point of pivotal connection of the tractor and the hitch, a connection between the arm and the end of the front gang opposite from the end of which the hitch is pivotally connected, a hold-back lever pivotally connected between its ends to the front disk gang, means pivotally connecting the hold-back lever at one end with the second bar of the hitch, and means connecting the other end of the hold-back lever with the rear disk gang at a point toward the end of the rear disk gang at which the said disk gang is angled apart in angled position.

10. In a tandem disk harrow, the combination of a pair of tandem disk gangs, means pivotally connecting the disk gangs in tandem relation to permit the same to swing to angled position, a hitch including a pair of hitch bars, one of which hitch bars is connected to the front disk gang near the end thereof at which the disk gangs are angled apart when in angled position, means connecting the said hitch bars together at the opposite end of the latter said bar, a tractor, means for pivotally coupling the tractor with the hitch, a turn arm mounted on the tractor and extending laterally from the point of pivotal connection of the tractor and the hitch, a connection between the arm and the end of the front gang opposite from the end of which the hitch is pivotally connected, a hold-back lever pivotally connected between its ends to the front disk gang, means pivotally connecting the hold-back lever at one end with the second bar of the hitch, and means connecting the other end of the hold-back lever with the rear disk gang at a point toward the end of the rear disk gang at which the said disk gang is angled apart in angled position, and a latch means interposed between the hold-back lever and the front disk gang for limiting the degree of angularity of the disk gangs in angled position.

11. In a device of the class described, a pair of tandem disk gangs, means for pivotally connecting said gangs together, a hitch connected to the forward of said gangs, said hitch being capable of moving relative to said forward gang of disks, a draft means, means for pivotally connecting the hitch with the draft means, and means operatively connected with the draft means at a point offset laterally from the point of pivotal connection of the hitch with the draft means and connected with the front disk gang and operative upon turning of the draft means to pull the closed end of the front gang of disks forwardly to permit the gangs of disks to follow the draft means in making a turn.

12. In a device of the class described, the combination of a pair of tandem disk harrow gangs, means for pivotally connecting said gangs together in tandem relation to permit said gangs to assume angled or non-angled relation to each other, a hitch connected with the forward gang of disks, said hitch being capable of moving relative to said forward gang of disks, a draft means pivotally connected with the hitch, and means connected with the draft means at a point offset from the point of pivotal connection of the hitch with the tractor and connected with the front gang of disks and operative upon turning of the draft means to pull the closed end of the disk gang from angled to non-angled position to permit the gangs of disks to follow the draft means in making a turn.

13. In a device of the class described, the combination of a pair of tandem disk gangs, means operatively connecting the gangs of disks together to permit the gangs to be moved to and from angled position so that said gangs are angled apart at one end of the device, a hitch operatively connected with the front gangs, said hitch being capable of moving relative to said forward gang of disks, a draft means pivotally connected to the forward end of the hitch, a turn connection, means connecting the turn connection at its forward end with the draft means at a point offset laterally from the point of pivotal connection of the hitch with the draft means, means connecting the turn means to the end of the front gang of disks opposite from the end at which said gangs are angled apart and operative upon the turning of the draft means in a direction around the ends of the gangs of disks at which the gangs are angled apart to pull the front gang of disks out of angled position to permit the gangs to follow the draft means in making a turn.

14. A tractor operated ground working implement comprising forward and rearward gangs of ground working tools, means interconnecting the gangs for relative angling movement in a horizontal plane, draft means flexibly connected to the tractor and to both gangs, and an angling control member connected to the tractor at a point offset laterally from the point of draft connection thereto and directly to the forward gang at a point offset laterally from the point of draft connection to that gang.

15. A tractor operated ground working implement comprising forward and rearward gangs of ground working tools, means interconnecting the gangs for relative angling movement in a horizontal plane including means for causing angular movement of one gang by virtue of angling movement of the other, draft means flexibly connected to the tractor and to both gangs, and an angling control member connected to the tractor at a point offset laterally from the point of draft connection thereto and directly to the forward gang at a point offset laterally from the point of draft connection to that gang.

16. A tractor operated ground working implement comprising forward and rear gangs of ground working tools, means interconnecting the gangs for relative angling movement in a horizontal plane, draft means flexibly connected to the tractor and embodying draft members severally flexibly connected to the forward and rear gangs, the rear-gang-connected member being movable fore and aft relative to the forward gang, stop means limiting the rearward movement of the front gang relative to the rear-gang-connected draft member, and a control member connected to the tractor at a point laterally offset from the point of draft connection thereto and connected to the front gang at a point laterally offset from the point of draft connection to that gang and acting, when the tractor turns toward the side opposite the lateral offset of control member connection to the tractor, to pull the front gang forward from its limiting rearward position with reference to the rear-gang-connected draft member.

17. A tractor operated ground working implement comprising forward and rear gangs of ground working tools, means interconnecting the gangs for relative angling movement in a horizontal plane, draft means flexibly connected to the tractor and embodying draft members severally flexibly connected to the forward and rear gangs, the rear-gang-connected member being movable fore and aft relative to the forward gang, and the front-gang-connected member being connected to that gang at a point to one side of the gang interconnection, stop means acting between the other side of the forward gang and the rear-gang-connected draft member to limit the rearward movement of the forward gang relative to said draft member, and a control member connected to the tractor at a point laterally offset from the point of draft connection thereto and connected to the front gang at its last mentioned side and acting, when the tractor turns toward the first mentioned side of the front gang, to pull the second mentioned side of the front gang forward from its limiting rearward position with reference to the rear-gang-connected draft member.

OSCAR W. SJOGREN.
ROLLIE H. MITCHELL.